(No Model.)

W. E. SELLECK.
SPROCKET WHEEL.

No. 405,607. Patented June 18, 1889.

Witnesses
Wm. M. Rheem.
Will R. Onohundro.

Inventor
William E. Selleck
By Jno. G. Elliott
Atty.

United States Patent Office.

WILLIAM E. SELLECK, OF CHICAGO, ILLINOIS.

SPROCKET-WHEEL.

SPECIFICATION forming part of Letters Patent No. 405,607, dated June 18, 1889.

Application filed May 9, 1888. Serial No. 273,367. (No model.)

*To all whom it may concern:*

Be it known that I, WILLIAM E. SELLECK, a citizen of the United States, and a resident of the city of Chicago, in the State of Illinois, have invented certain new and useful Improvements in Sprocket-Wheels, of which the following is a specification.

This invention relates to improvements in sprocket-wheels in which detachable sprockets are employed, and has for its prime object to simplify and strengthen the construction of such wheels when especially designed for use in connection with conveyers for heavy commodities—such as coal, crushed stone, and the like—whereby the liability of breakage is reduced to a minimum and great economy of expense and time effected in replacing a broken sprocket.

Figure 1:
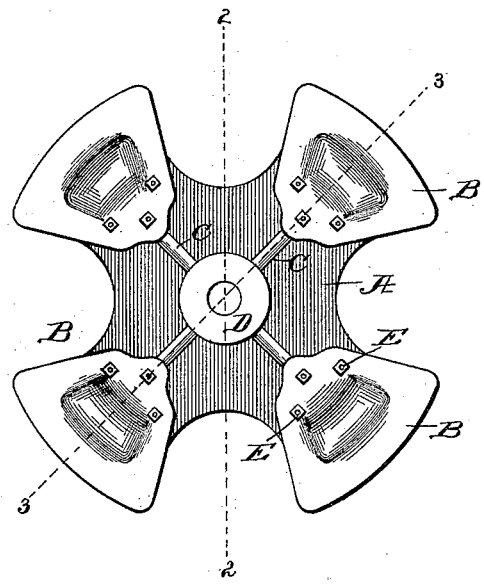
Figure 2:
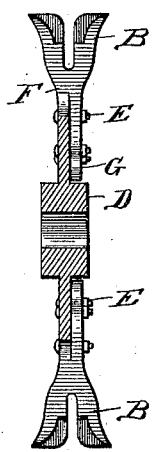
Figure 3:
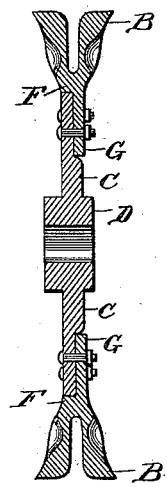

In the drawings, Figure 1 represents a side elevation of a sprocket-wheel embodying my invention; Fig. 2, a central section thereof on the line 2 2 of Fig. 1, and Fig. 3 a similar section on the line 3 3 of Fig. 1.

Similar letters of reference indicate the same parts in the several figures of the drawings.

Referring by letter to the accompanying drawings, A indicates a spider, to which the sprockets B are attached, the said spider being preferably a casting provided with radial strengthening-ribs C, against which the sprockets abut, and having a hub D, by which the wheel is mounted on the shaft. This spider-wheel preferably has four legs, to the outer end of each one of which is attached, by means of screw-bolts E, the sprockets B, before mentioned, the sprockets being provided with offsets or shoulders F, which seat upon the ends of the spider-legs, so as to relieve the bolts from the pressure on the sprockets, the said shoulders being supplemented in this function by the inner ends G of the sprockets bearing against the outer ends of the strengthening-ribs C of the spider.

By the employment of the transverse bolts just described, in connection with the shoulders on the sprockets and spider for securing the former to the latter, not only may a light but strong and durable sprocket-wheel be produced, but the said bolts are not subject to the radial strain of the sprockets and are at all times out of the way of the sprocket-chain used in connection with said wheel, and are therefore not subjected to any wear from contact therewith, as in the case of sprockets as heretofore attached, and such a connection is of especial value in case of the breakage of any one of the sprockets, for a new sprocket may be substituted and secured in position without the necessity of removing the sprocket-chain from the wheel or the wheel from the shaft, as the setting of the bolts is not in the least interfered with.

A sprocket-wheel such as herein described is especially designed for use in connection with a conveyer provided with buckets, which are so attached thereto at intervals as to fit in the space between the sprockets on the wheel, such conveyers being generally employed for carrying coal, crushed stone, and similar commodities the nature of which is liable at any time to cause the fracture of one of the sprockets, and the said wheel must be so constructed as to afford the least opportunity for lodgment thereon of particles of coal or stone, which, if caught between the conveyer and wheel, might result fatally for the wheel, and it is with especial reference to this liability that the wheel herein shown is constructed.

In practice the detachable sprockets, as well as the rimless spider-wheels, are kept in stock and from which duplicate orders of either of these parts are filled, the sprockets and wheels being made interchangeable, as it is well known that one wheel will frequently wear out several sets of the sprockets, and it is therefore of the utmost importance to have these parts detachable and interchangeable to effect economy of both time and material, thereby reducing the expense of such devices to the minimum.

Having described my invention, what I claim, and desire to secure by Letters Patent, is—

In a sprocket-wheel, the spider provided with strengthening-ribs on the legs thereof, constituting shoulders, in combination with sprockets, also provided with shoulders bearing against the ends of said legs, the ends of said sprockets bearing against the shoulders of the strengthening-ribs, and bolts intermediate said shoulders for detachably securing the sprockets to the spider, substantially as described.

WILLIAM E. SELLECK.

Witnesses:
WILL R. OMOHUNDRO,
ALBERT M. BENNETT.